United States Patent [19]

Craven

[11] 3,878,147

[45] Apr. 15, 1975

[54] COMPOSITION FOR INCREASING THE FRICTION OF SURFACES ON ICE

[75] Inventor: James M. Craven, Wilmington, Del.

[73] Assignee: E. I. du Pont de Nemours and Company, Wilmington, Del.

[22] Filed: Dec. 27, 1973

[21] Appl. No.: 428,722

[52] U.S. Cl............ 260/18 R; 117/139; 260/32.8 A; 260/33.6 A; 260/33.8 UA; 260/42.54; 260/42.57; 260/998.13
[51] Int. Cl................................................ C09k 3/14
[58] Field of Search..... 260/33.6 A, 32.8 A, 41.5 R, 260/41.5 A, 998.13, 42.54, 42.57, 33.8 UA, 18 R; 106/36; 117/139

[56] References Cited
UNITED STATES PATENTS

| | | | |
|---|---|---|---|
| 2,739,135 | 3/1956 | Delang | 260/998.13 |
| 3,350,342 | 10/1967 | Begley | 260/33.6 |
| 3,475,205 | 10/1969 | Byers | 117/139 |
| 3,600,329 | 8/1971 | Enriquez | 252/428 |
| 3,652,720 | 3/1972 | Wright | 260/876 B |

Primary Examiner—Allan Lieberman

[57] ABSTRACT

The composition of this invention is utilized to increase the friction of surfaces on ice such as the tread surfaces on automobile and truck tires; the composition contains 5–25% by weight of a soluble elastomer such as a styrene-butadiene-styrene block copolymer;

43–92.99% by weight of a solvent for the elastomer;

2–20% by weight of dispersed, hard, inorganic particles, such as diatomaceous earth, having a particle size of 0.2 to 105 microns; and optionally, 0.01–2% by weight of an antisettling agent for the particles;

an aerosol composition is another aspect of this invention which contains 25–95% by volume of the above composition and 75–5% by volume of a propellant.

4 Claims, No Drawings

COMPOSITION FOR INCREASING THE FRICTION OF SURFACES ON ICE

BACKGROUND OF THE INVENTION

This invention is related to a composition that is used to increase the friction of surfaces on ice, e.g., the tread surfaces of automobile and truck tires.

Slippery road conditions resulting from sleet, snow, and ice cause many vehicle accidents and often cause automobiles and trucks to become immobilized when stopped or parked. A tire-traction compound that can easily be applied before or during travel and that will adhere to the tire for several miles would be extremely useful under the aforementioned conditions to reduce accidents and to prevent a vehicle from becoming stuck. Compositions previously used for this purpose either did not adhere to the tire, wore off the tire after only a short distance of travel, did not provide the necessary level of friction, or clogged the nozzle or valve of the dispensing vessel.

The novel composition of this invention contains a binder and fine particles and has excellent adherence to rubber substrates such as tire treads, provides a high level of friction on icy roads, and is easily dispensed from a vessel without clogging the nozzle or valve of the dispensing vessel.

SUMMARY OF THE INVENTION

The composition of this invention consists essentially of
- 5–25% by weight of a soluble elastomer;
- 43–92.99% by weight of a solvent for the elastomer having a high evaporation rate;
- 2–20% by weight of dispersed, hard, inorganic particles having a particle size of 0.2 to 105 microns; and optionally
- 0.01–2% by weight of an antisettling agent for said particles;

another aspect of this invention comprises an aerosol composition of 25 to 95% by volume of the novel composition and 75 to 5% by volume of a propellant.

DESCRIPTION OF THE INVENTION

The novel composition of this invention contains an elastomer which may be dissolved or dispersed in a liquid. Preferably, the elastomer is dissolved in the liquid. The composition contains about 5–25% by weight of the elastomer, but preferably about 7–15% by weight of the elastomer is used.

The following elastomers can be used in the novel composition: styrene-butadiene-styrene block copolymer rubber; chlorosulfonated polyethylene, polyester or polyether polyurethanes, polyureas, poly(methylacrylate). Preferably, the elastomers have a Shore Hardness of 30A to 80D and more preferably about 50–70A. The styrene-butadiene-styrene block copolymer rubbers are preferred and form a high-quality composition with excellent adhesion to conventional automobile and truck tires.

The novel composition contains about 43–92.99% by weight of a solvent for the elastomer. If the elastomer is dispersed, a blend of a solvent and a nonsolvent can be used. Preferably, a solvent for the elastomer is used. The solvent should evaporate at high rate under ambient conditions so that the composition dries rapidly after application. Typical solvents include: cyclohexane, hexane, toluene, methyl ethyl ketone, methylene chloride, acetone, tetrahydrofuran, naphtha, diethyl ether, methyl isobutyl ketone, carbon tetrachloride, xylene, benzene, chloroform, carbon disulfide, 1,1,2,2-tetrachloroethane. Preferably, about 69.5–88.5% by weight of an organic solvent is used, and the preferred organic solvents are cyclohexane, hexane, toluene, and methyl ethyl ketone, and mixtures thereof.

To provide the necessary level of friction, the novel composition contains about 2–20% by weight of hard, inorganic particles such as diatomaceous earth, silicon carbide, aluminum oxide, silica, calcium carbonate, clay, magnesium silicate, calcium sulfate, potassium aluminum silicate, mica, barium sulfate, calcium silicate, aluminum silicate or crushed glass. Preferred are particles of diatomaceous earth, silicon carbide and aluminum oxide. To be effective in providing a high level of friction, the particles have a size of about 0.2 to 105 microns and preferably 5 to 62 microns and, more preferably, 10 to 44 microns. In one preferred embodiment of this invention, the novel composition contains 4–15% by weight of diatomaceous earth particles.

To keep the aforementioned particles in the novel composition from hard settling and to retard flocculation of the particles, preferably about 0.01–2% of an antisettling agent is used. Typical antisettling agents are aluminum stearate, hydrous magnesium aluminum silicate, alkylol amine salts of unsaturated fatty acids, calcium stearate, zinc stearate, fumed silica, zinc palmitate, dispersions of "Bentone" clay, aluminum octoate and other metallic soaps. About 0.5–1.5% by weight of aluminum stearate forms a high-quality composition wherein the particles do not hard settle but can be easily redisposed in the container with moderate agitation.

One particularly high-quality composition contains about
- 7–15% by weight of a styrene-butadiene-styrene block copolymer rubber;
- 69.5–88.5% by weight of an organic solvent for the rubber such as cyclohexane, hexane, toluene, methyl ethyl ketone, or mixtures of these solvents;
- 4–15% by weight of diatomaceous earth particles having a particle size of 10 to 44 microns;
- 0.5–1.5% by weight of aluminum stearate.

The novel composition of this invention can be used as an aerosol. This is accomplished by charging about 25 to 95 percent by volume of the novel composition with about 75 to 5 percent by volume of a propellant in a conventional aerosol container. Typical propellants that can be used are halogenated hydrocarbons such as dichlorodifluoromethane, chlorodifluoromethane or mixtures of one or more of these propellants with trichloromonofluoromethane, or dichlorotetrafluoroethane. Hydrocarbon gases such as butane, propane, isobutane or mixtures thereof can be used. Compressed gases such as carbon dioxide, nitrous oxide, nitrogen or mixtures of two or more of these propellants can be used with the above hydrocarbon or halogenated hydrocarbon propellants. One preferred propellant comprises a mixture of trichloromonofluoromethane and carbon dioxide.

The novel composition can be applied by brushing, dipping, spraying and the like; but the preferred method is to apply the composition as an aerosol spray. The composition is applied to a dry thickness of about 0.5–5 mils; but, preferably, about 1–2 mils are applied. The novel composition can be applied to a variety of substrates such as to hydrocarbon rubber compounds as are conventionally used for automobile and truck tire treads. The novel composition can be applied to the shoe and boot soles of a variety of materials such as polyvinyl chloride, leather, natural and synthetic hydrocarbon rubbers and the like, to skis to slow the rate of descent for beginners, to crutch tips and the like.

Obviously, the foremost use of the novel composition is as a tire-traction-promoting compound, and the composition is applied to the tread of automobile or truck tires to provide a high-friction surface. This surface is about 1–2 mils in thickness and remains on the tire at least 5–10 miles, depending on road conditions.

The following examples illustrate the invention. All parts and percentages are by weight unless otherwise indicated.

EXAMPLE 1

The following ingredients are blended together to form a composition:

| | Parts by Weight |
|---|---|
| "Kraton" 1102- (Styrene-butadiene-styrene block copolymer rubber having a tensile strength of 400 psi*, an ultimate elongation of 880%, a viscosity of 400 centipoises measured at 20% polymer solids in toluene at 23°C) | 9.31 |
| Cyclohexane | 43.61 |
| Hexane | 36.90 |
| "Celite White Mist" particles (diatomaceous earth having a particle size of less than 300 mesh [50 microns]) | 9.27 |
| Aluminum stearate anti-settling agent | 0.90 |
| | 100.00 |

*psi-pounds per square inch

The copolymer rubber and solvents are charged into a mixing vessel and stirred until the rubber is dissolved. The particles and the anti-settling agent are added and the composition is stirred until the particles are uniformly dispersed. The resulting composition has a solids content of about 19.5% by weight. The composition is stable and does not hard settle The particles can be redispersed with slight agitation even after long periods of standing on a shelf.

The above composition is sprayed onto the tread surface of the two rear tires of a Vega sedan weighing 2480 lbs. to provide a uniformly thick film on each of the tires. The sedan is in an ice skating rink and is fastened with nylon towing straps to a post. A dynamometer is fastened to one strap attached to the post and the second strap is attached to the sedan. The pulling force in pounds of the sedan is measured on ice at 0°C and on ice at −8°C. The pulling force is measured for the same sedan with untreated tires under the same ice temperature conditions. The same sedan is then equipped with two studded snow tires, and the pulling force is measured under the above conditions.

The results of the above tests are recorded in the following table:

| | DYNAMOMETER TESTS WITH VEGA SEDAN ON ICE SKATING RINK | | | |
|---|---|---|---|---|
| | Pull (pounds) From 2480 Pound Vega on Ice | | | |
| Ice Temperature | 0°C | | −8°C | |
| | Maximum Pull | Pull Wheels Spinning | Maximum Pull | Pull Wheels Spinning |
| Untreated tires | 31 | 25 | 266 | 71 |
| Treated tires | 190 | 100 | 347 | 87 |
| Studded snow tires | 234 | 82 | 327 | 107 |

The test results show a significant improvement in the amount of pull in pounds of the treated tires in comparison to the untreated tires. Under some conditions the treated tires even have a greater pull than studded snow tires.

EXAMPLE 2

An aerosol spray composition is prepared by charging into a conventional spray can 10 fluid ounces of the composition prepared in Example 1 with 2 ounces of trichloromonofluoromethane propellant then the can is charged with gaseous carbon dioxide to a gauge pressure of 90 psi at 25°C. The composition is easily sprayed from the can and does not clog the spray nozzle. Even after the can has stood for long periods of time, the composition can be redispersed with moderate shaking of the can and is easily spray applied as above.

EXAMPLE 3

The following compositions are prepared:

| Composition | A | B | C | D |
|---|---|---|---|---|
| "Kraton" 1102 rubber (described in Example 1) | 2.60 | 2.60 | 2.60 | 2.60 |
| Cyclohexane | 12.10 | 12.10 | 12.10 | 12.10 |
| Hexane | 10.30 | 10.30 | 10.30 | 10.30 |
| "Celite White Mist" particles (described in Example 1) | 2.58 | 2.58 | 2.58 | 2.58 |
| "Bentone" dispersion (disperion of hydrous magnesium aluminum silicate mineral) | 0.25 | 0.10 | — | — |
| "Texaphor" anti-settling agent | — | — | 0.50 | — |
| "Anti-Terra" A (alkylol amine salt of an unsaturated fatty acid) | — | — | — | 0.50 |
| TOTAL | 27.83 | 27.68 | 28.08 | 28.08 |

As in Example 1, the constituents for the composition are charged into a mixing vessel and thoroughly blended together to uniformly disperse the particles. Each of the above compositions is stable for long periods of time and can easily be redispersed, and each of the compositions provides traction to automobile tires as illustrated in Example 1.

The invention claimed is:

1. A composition consisting essentially of
   5–25% by weight of a soluble elastomer having a Shore A Hardness of 30A to 80D and consisting essentially of a styrene-butadiene-styrene block copolymer rubber;

43–92.99% by weight of an organic solvent for the elastomer having a high evaporation rate;
2–20% by weight of dispersed diatomaceous earth particles having a particle size of 0.2 to 105 microns; and
0.01–2% by weight of an antisettling agent for said particles.

2. The composition of claim 1 in which the antisettling agent is selected from the group consisting of aluminum stearate, hydrous magnesium aluminum silicate, and an alkylol amine salt of an unsaturated fatty acid.

3. The composition of claim 1 consisting essentially of
7–15% by weight of a styrene-butadiene-styrene block copolymer rubber;
69.5–88.5% by weight of an organic solvent for said rubber;
4–15% by weight of diatomaceous earth particles having a particle size of 5 to 62 microns and
0.5–1.5% by weight of aluminum stearate.

4. The composition of claim 3 in which the organic solvent is selected from the group consisting of cyclohexane, hexane, toluene, methyl ethyl ketone, and mixtures of these solvents.

* * * * *